(No Model.) 10 Sheets—Sheet 3.
F. A. MESSER & W. F. THORPE.
MEANS FOR CHECKING AND RECORDING MONEY PAYMENTS.
No. 463,527. Patented Nov. 17, 1891.
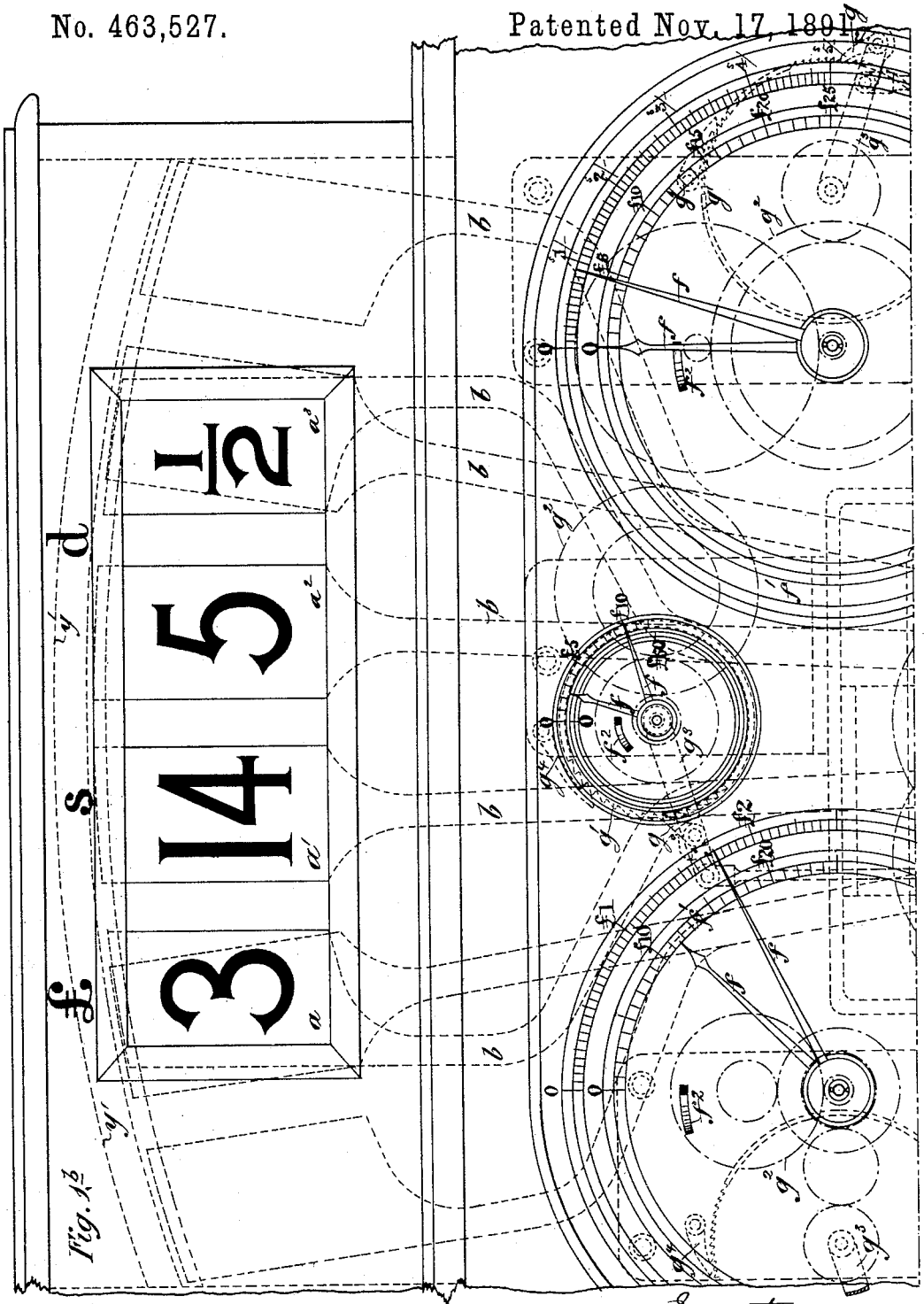

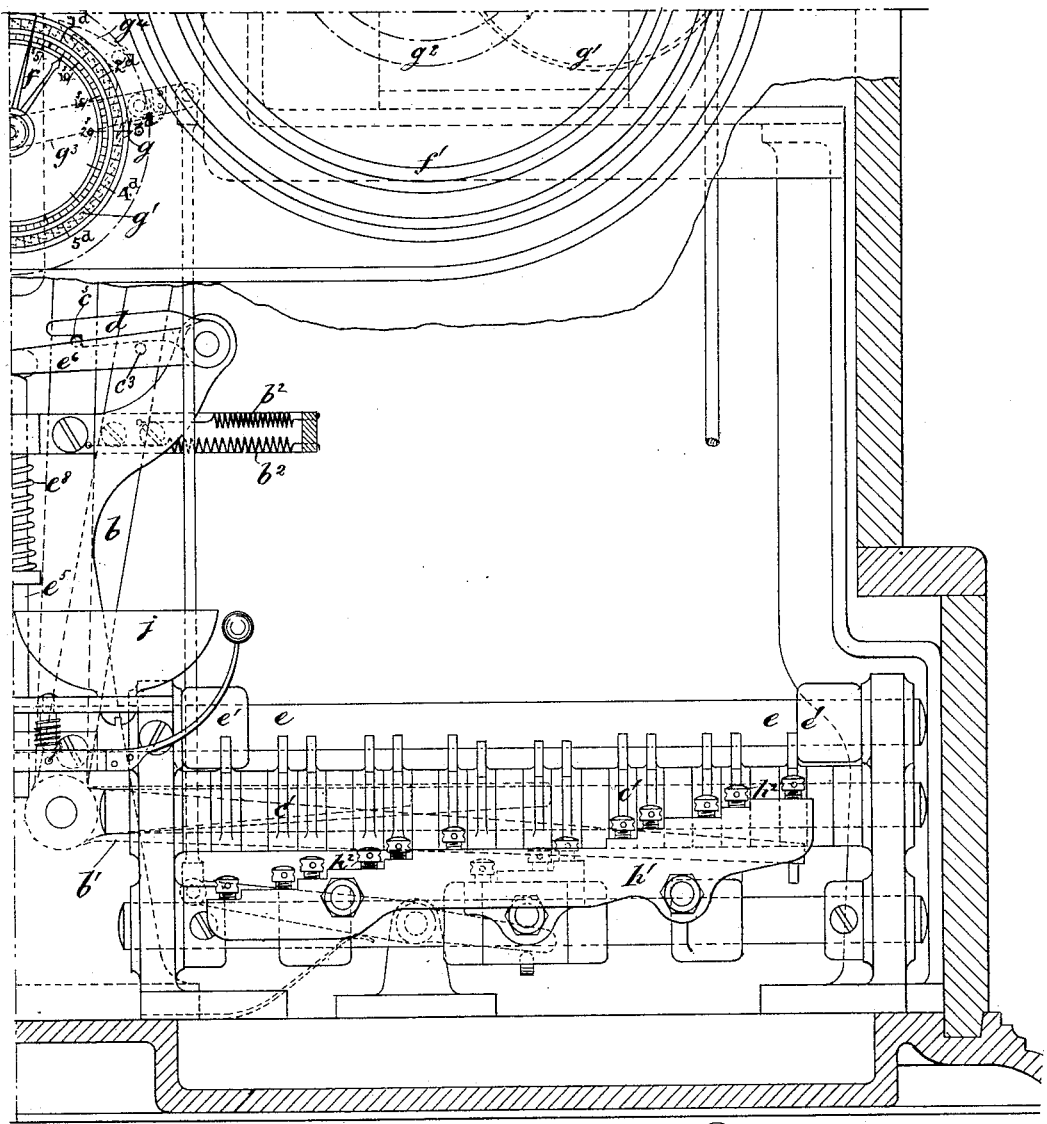

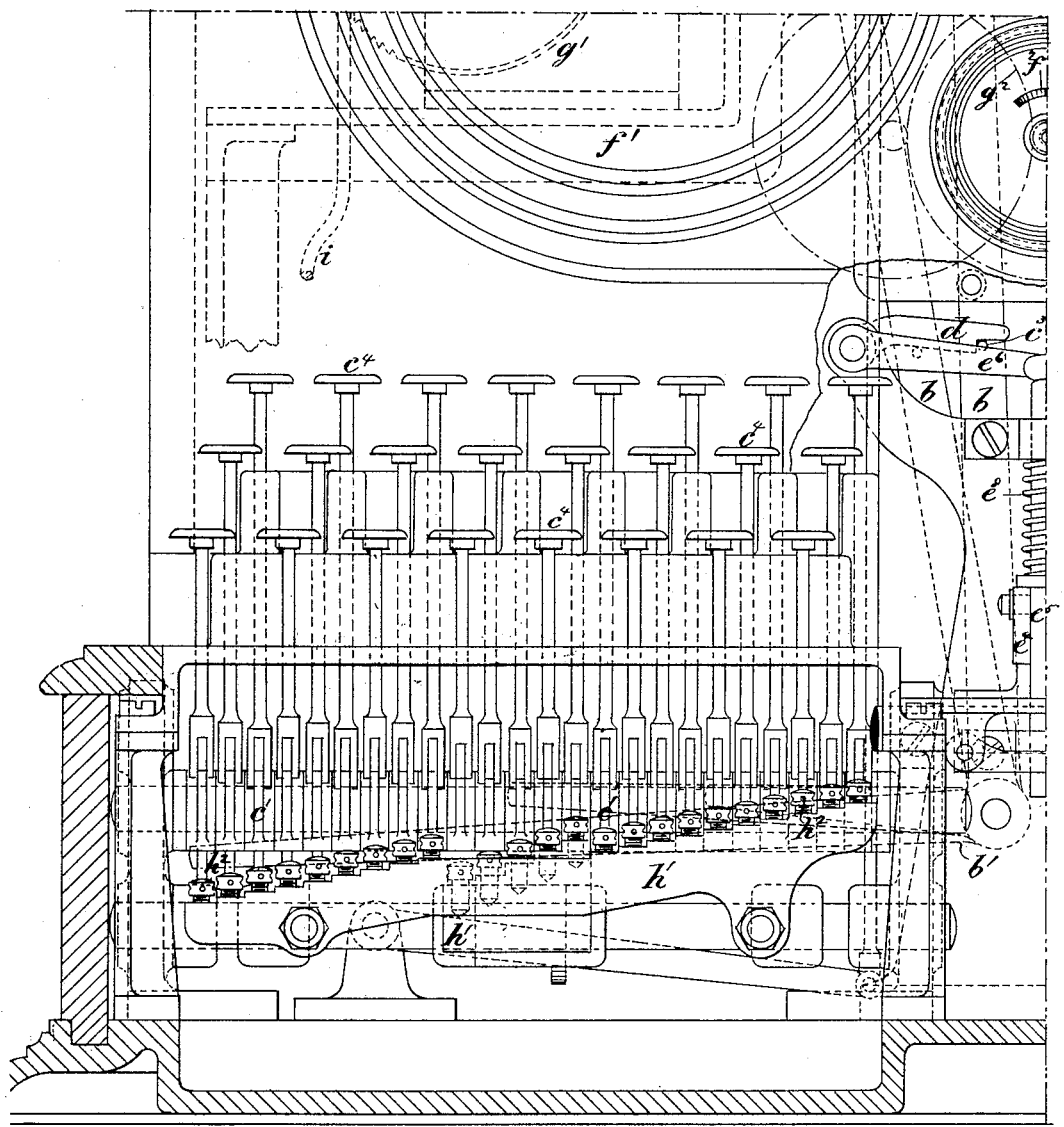

(No Model.) 10 Sheets—Sheet 4.
F. A. MESSER & W. F. THORPE.
MEANS FOR CHECKING AND RECORDING MONEY PAYMENTS.
No. 463,527. Patented Nov. 17, 1891.
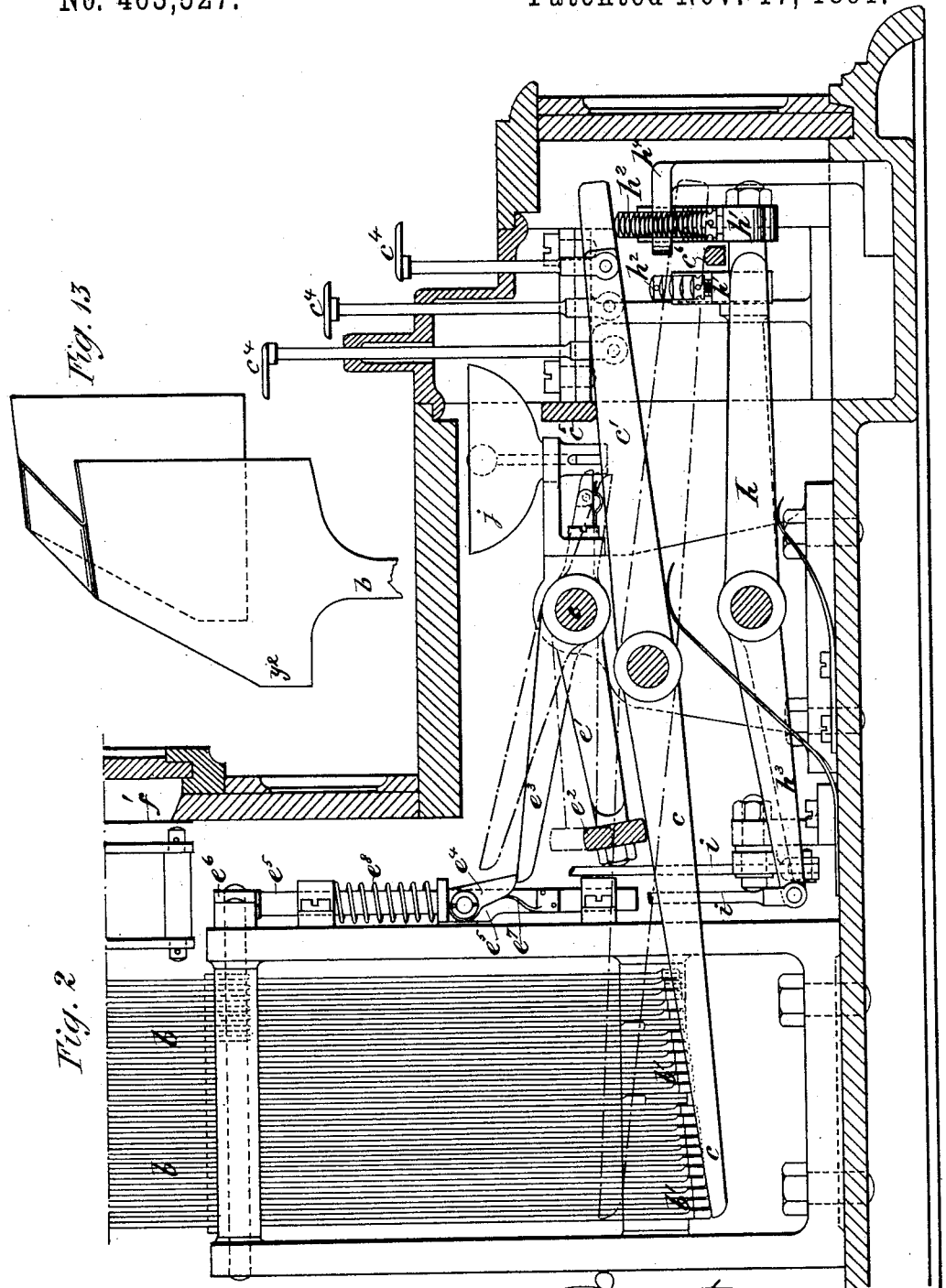

(No Model.) 10 Sheets—Sheet 5.
F. A. MESSER & W. F. THORPE.
MEANS FOR CHECKING AND RECORDING MONEY PAYMENTS.
No. 463,527. Patented Nov. 17, 1891.
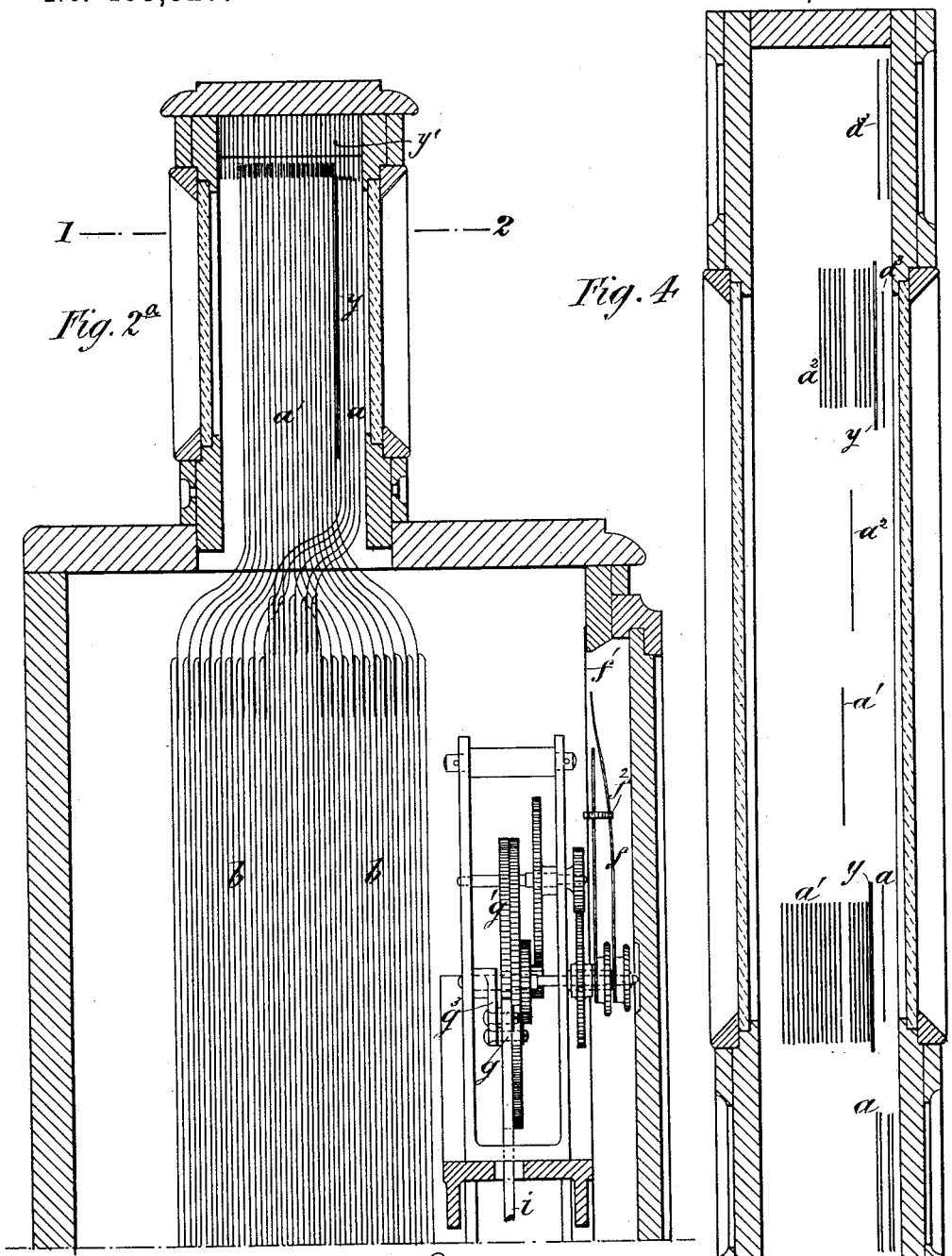

(No Model.) 10 Sheets—Sheet 6.
F. A. MESSER & W. F. THORPE.
MEANS FOR CHECKING AND RECORDING MONEY PAYMENTS.
No. 463,527. Patented Nov. 17, 1891.
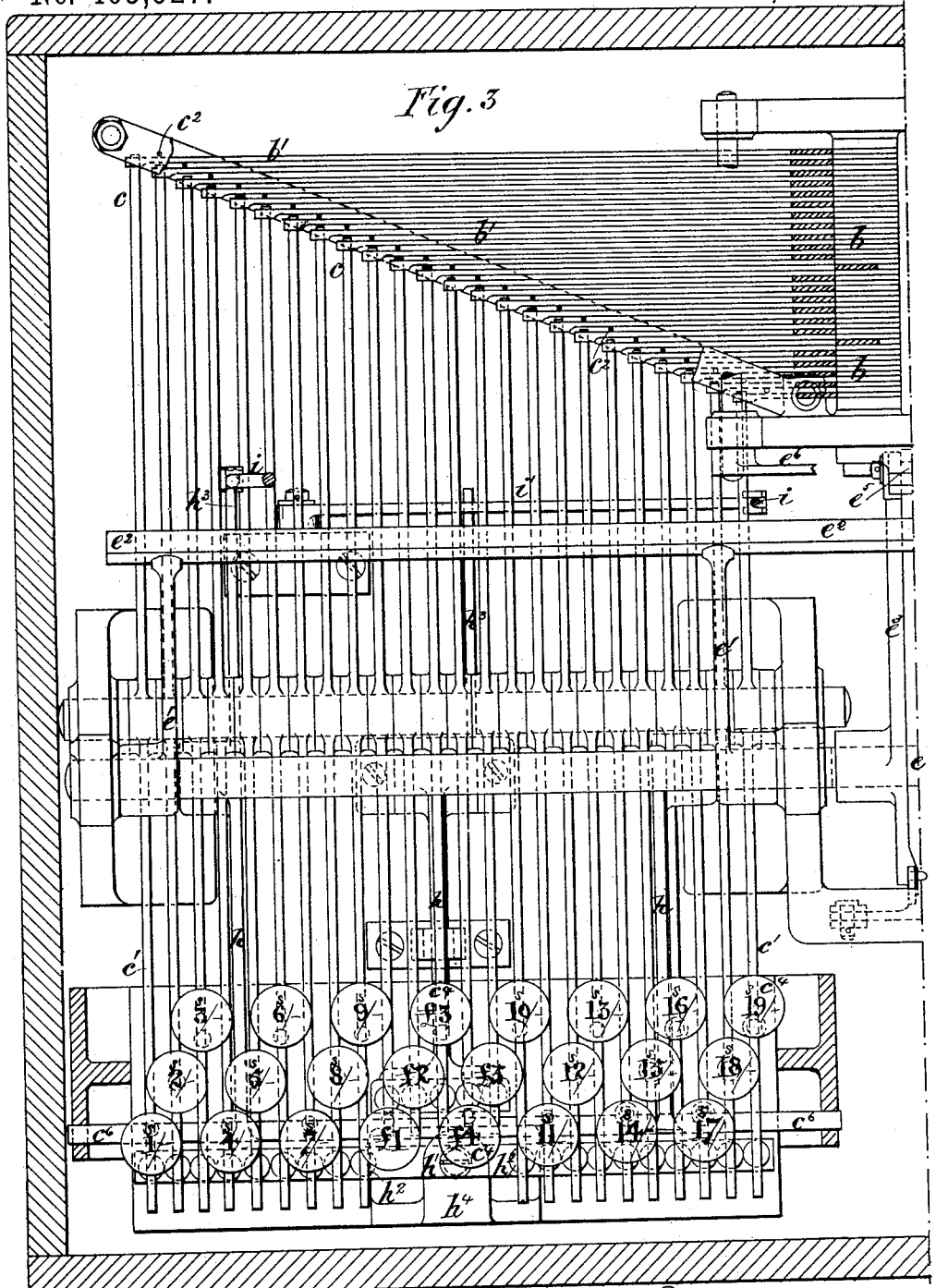

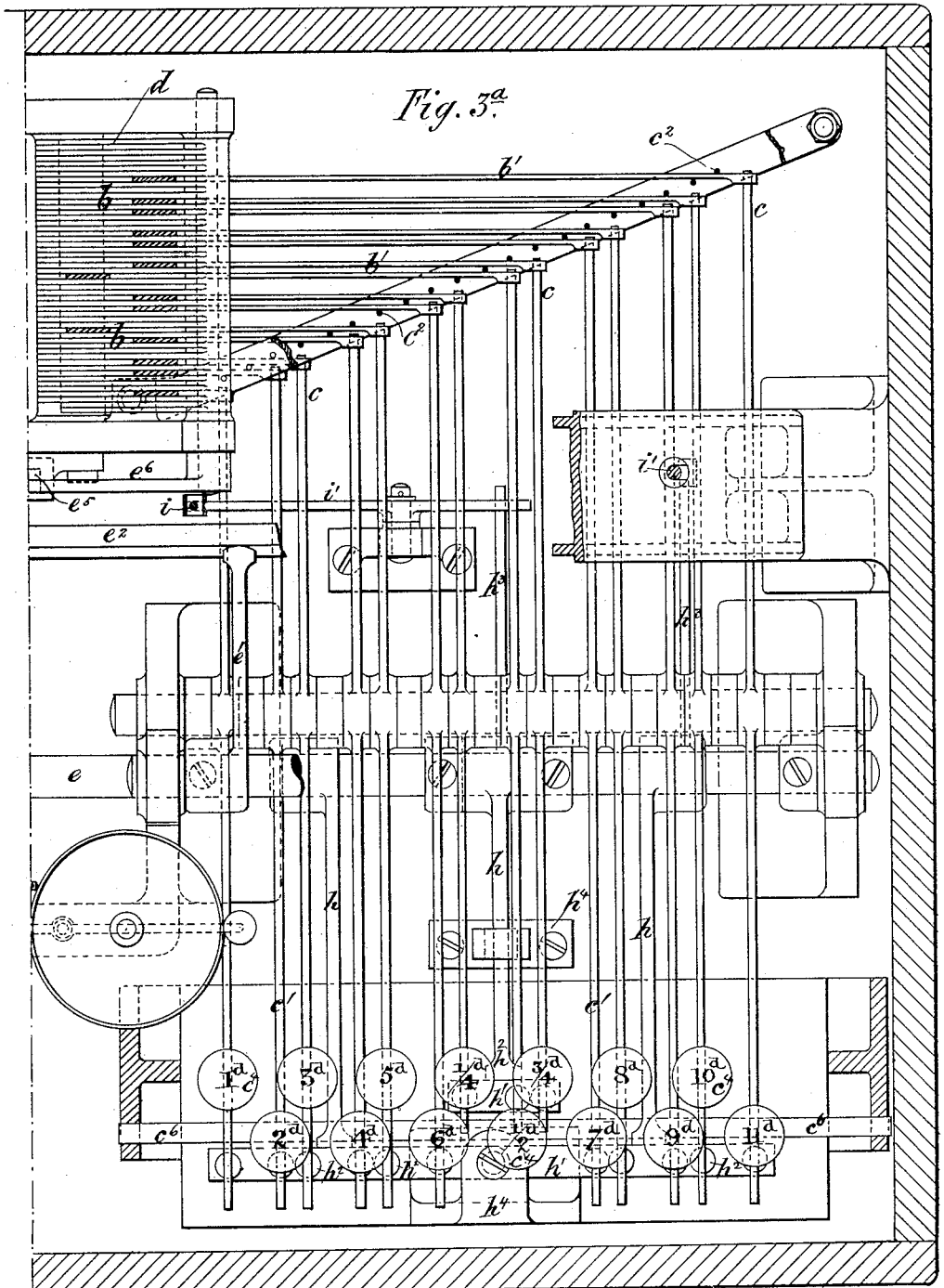

(No Model.) 10 Sheets—Sheet 8.
F. A. MESSER & W. F. THORPE.
MEANS FOR CHECKING AND RECORDING MONEY PAYMENTS.
No. 463,527. Patented Nov. 17, 1891.
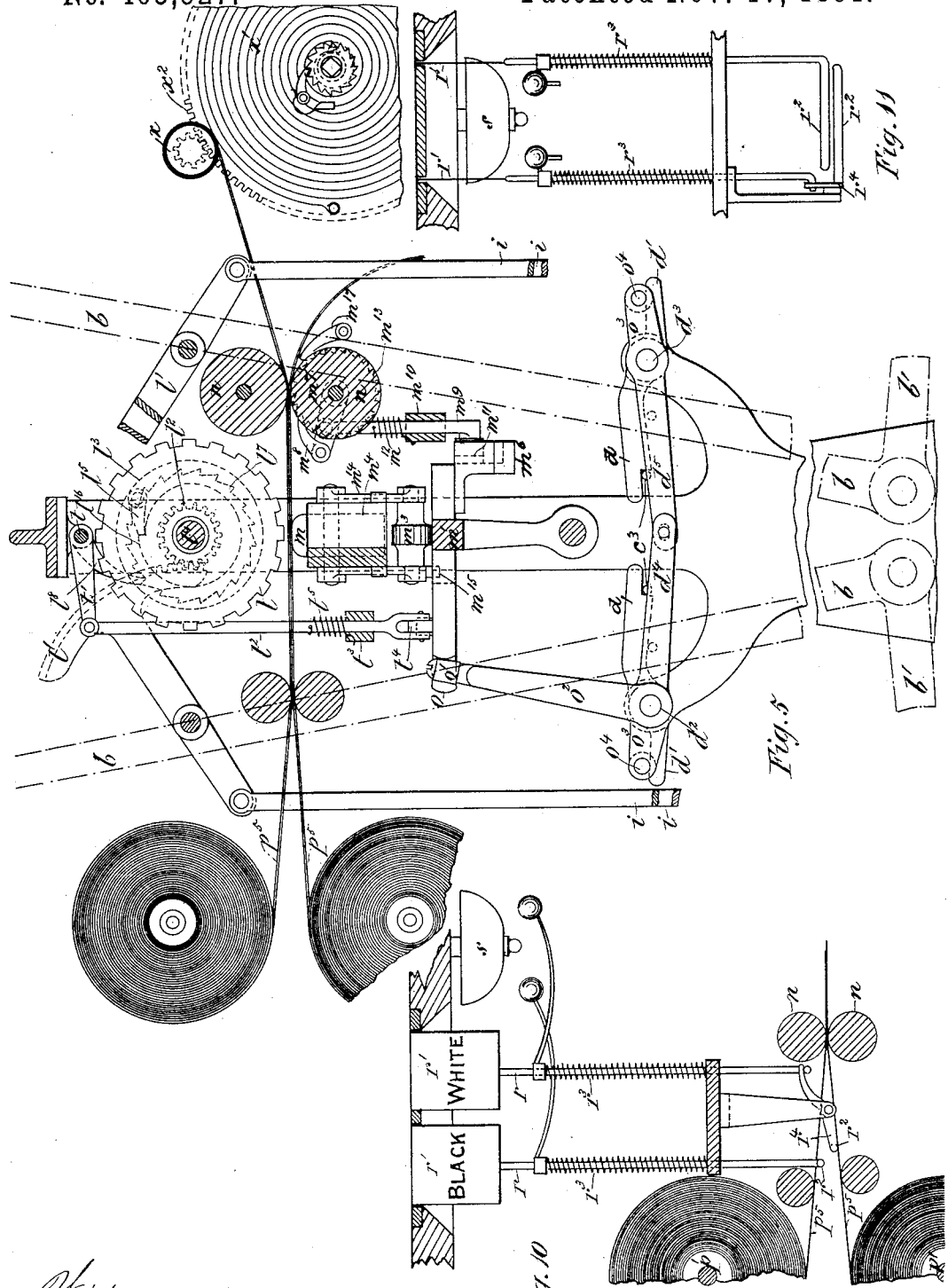

(No Model.) 10 Sheets—Sheet 9.
F. A. MESSER & W. F. THORPE.
MEANS FOR CHECKING AND RECORDING MONEY PAYMENTS.
No. 463,527. Patented Nov. 17, 1891.
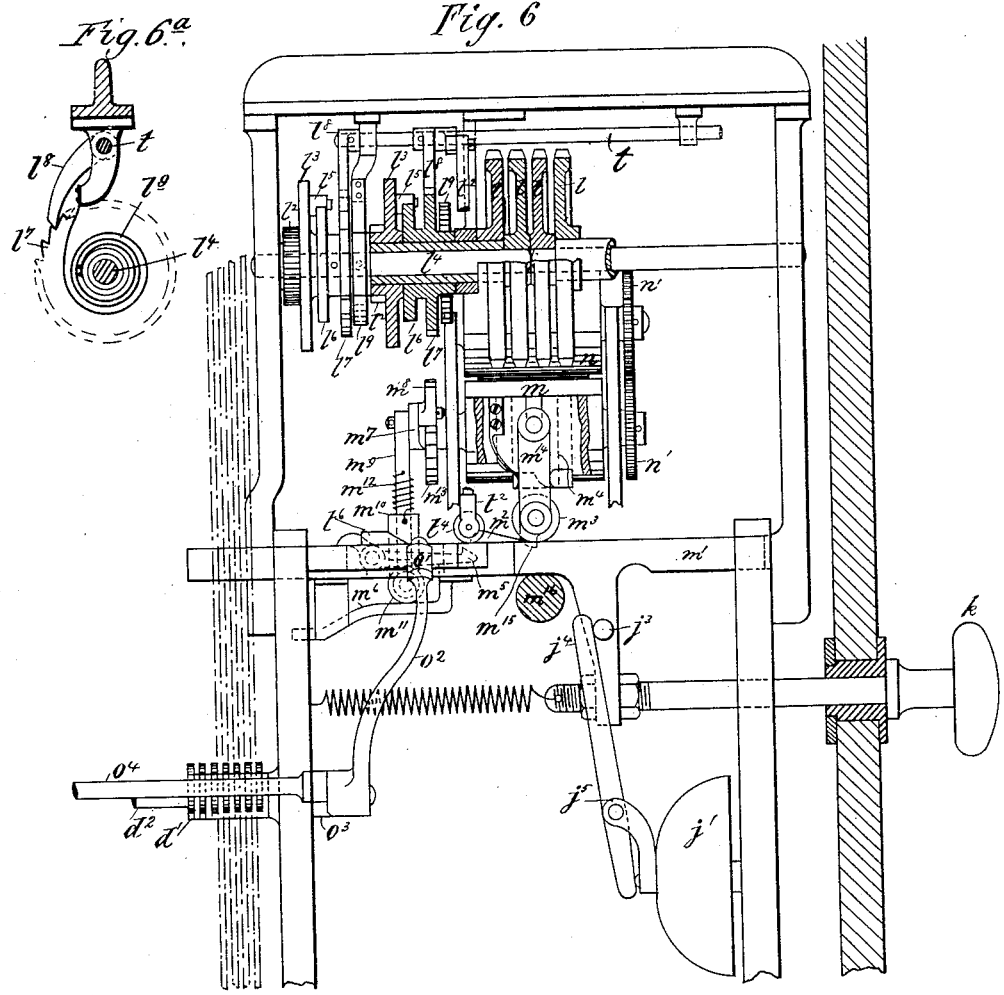

(No Model.) 10 Sheets—Sheet 10.
F. A. MESSER & W. F. THORPE.
MEANS FOR CHECKING AND RECORDING MONEY PAYMENTS.
No. 463,527. Patented Nov. 17, 1891.
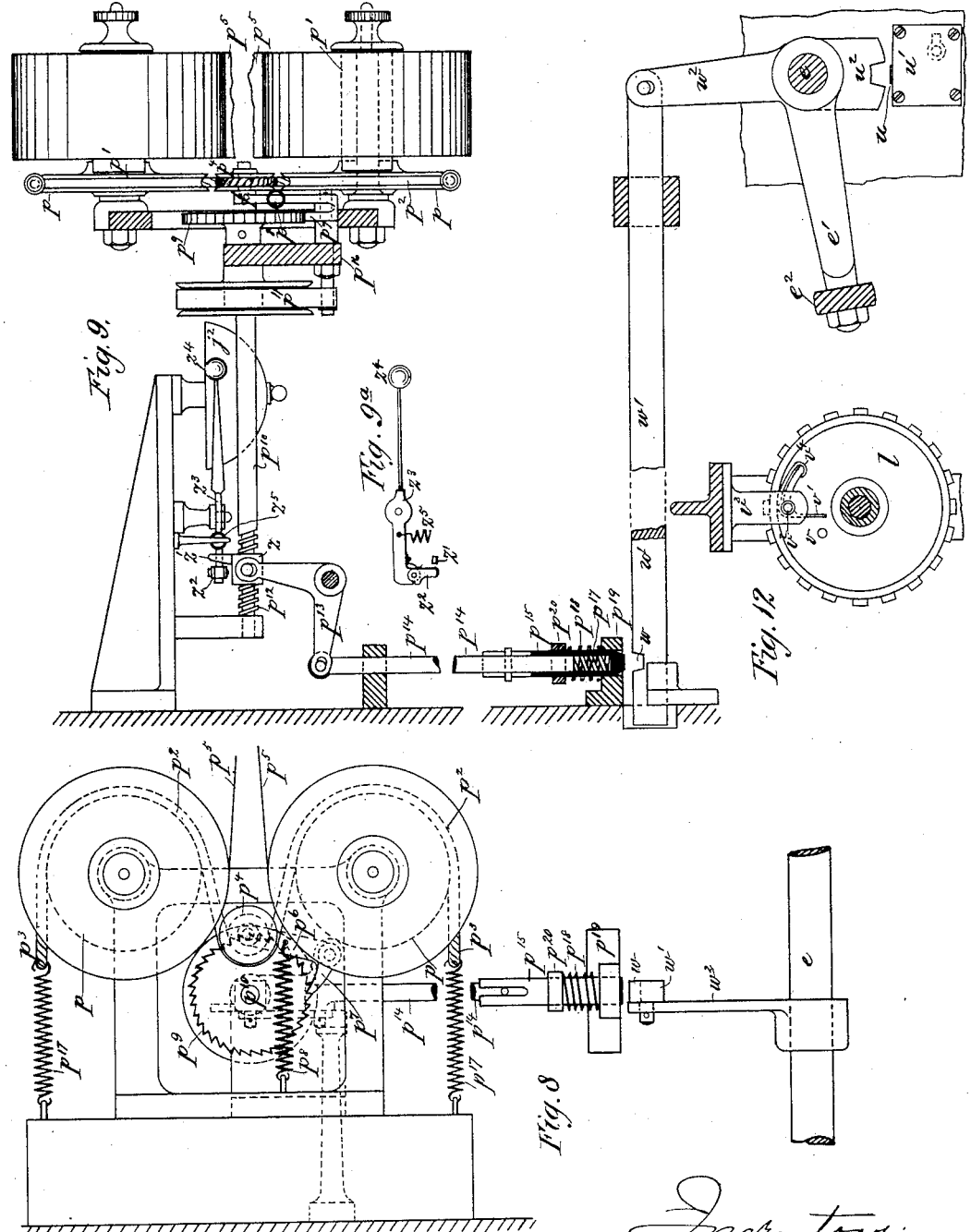

UNITED STATES PATENT OFFICE.

FREDERICK ALFRED MESSER AND WALTER FULLER THORPE, OF LONDON, ENGLAND.

MEANS FOR CHECKING AND RECORDING MONEY PAYMENTS.

SPECIFICATION forming part of Letters Patent No. 463,527, dated November 17, 1891.

Application filed October 12, 1889. Serial No. 326,817. (No model.) Patented in England April 11, 1888, No. 5,396.

*To all whom it may concern:*

Be it known that we, FREDERICK ALFRED MESSER and WALTER FULLER THORPE, engineers, subjects of the Queen of Great Britain, both residing at 8 Quality Court, Chancery Lane, in the county of Middlesex, England, have invented certain new and useful Improvements in Means and Appliances for Checking and Recording the Payment and Receipt of Money and Analogous Operations, (for which we have obtained a patent in Great Britain, No. 5,396, bearing date April 11, 1888,) of which the following is a specification.

Our invention relates to improved mechanism and arrangements of the same for indicating, checking, and registering the payment and receipt of money and analogous operations.

The indicating portion of our invention is so arranged and the mechanism for actuating the figures belonging to the various denominations is so constructed that any figure or set of figures forming a sum in the sequence of any denomination—as, for example, £1, or 19s., or 2d., or ½d—can be so adjusted and placed with regard to the figures of other denominations that every combination necessary to form a perfect money sequence within the extremes of the highest and lowest values determined upon can be displayed. By this arrangement the figures representing the amount of any transaction always appear in their natural consecutive order and symmetrical position—as, for example, the following figures: £3 14s. 5½d.

Our invention consists in a cash indicating and registering machine inclosed in a suitable case fitted with keys and tablets or their equivalents. We record the amounts on dials or by printing mechanism fitted inside the case, such mechanism being suitably governed and controlled by the operation of the keys.

In carrying out our invention we arrange the figures on the faces of tablets, the necessary motion being given to the same by the depression of keys or buttons or equivalent appliances. Further, in combination with the before-mentioned part of the apparatus we arrange dials and pointers for respectively registering and totaling under their respective denominations the various amounts of each transaction, or we record by printing the amount of each transaction on a ribbon of paper or other suitable material, hereinafter called "ribbon." With regard to the keys or buttons (which are arranged to project beyond the case wherein the mechanism is inclosed) we prefer, for English money, to have a sufficient number of these keys to represent the following denominations or values, namely: from 1 to any other convenient number to represent pounds, next 1 to 19 for shillings, 1 to 11 for pence, and similar mechanism for each fraction of a penny—namely, ¼, ½, and ¾. These values are marked upon their respective keys or upon the case against their respective keys. On the depression of any single key the amount which that key represents is shown at an aperture or apertures in the upper part of the case. At the same time a bell or alarm is sounded and the amount received and indicated is registered upon a suitable dial, by preference so inclosed and protected by lock or other means that it cannot be tampered with. In the above example, where a key of one denomination only is operated upon, the amount of cash to be indicated and registered is necessarily only of one denomination—namely, either of pounds, shillings, pence, or fractions of a penny—as, for example £2, or 11s., or 8d., or ½d. When the amount of cash received is made up of two or more denominations two or more keys would be required to be simultaneously depressed or kept depressed, or they may be depressed consecutively if the first-manipulated keys are kept depressed until the whole of the keys required for the transaction are down. (When we use a release key or knob then the keeping down together of the other keys is not necessary.) The keys may then be depressed one after the other and allowed to rise at once. For example, if the amount be made up of pounds, shillings, and pence, and fractions of a penny, four keys or buttons would simultaneously be manipulated, and the figures representing the amount so received would be shown in their true consecutive order at a suitable aperture or apertures in the upper part of the case, as before mentioned.

In order that our said invention may be particularly described and ascertained, reference is hereby made to the accompanying drawings, in which similar letters of reference indicate corresponding parts.

Figures 1, 1$^a$, and 1$^b$ are partial views, which, taken together, show a front elevation, partly in section. Figs. 2 and 2$^a$ are partial views, which, taken together, show a side elevation, partly in section. Figs. 3 and 3$^a$ are partial views, which, taken together, show a plan, partly in section. Fig. 4 is a section on the line 1 2 of Fig. 2. Fig. 5 is an elevation showing the arrangement of the apparatus when a printed record is required to be kept. Fig. 6 is a side elevation of the last-mentioned printing arrangement. Fig. 6$^a$ is a detail view hereinafter referred to. Fig. 7 is a plan of the sliding bar $m'$ belonging to the release-key. Fig. 8 is a front elevation of our arrangement for automatically locking the machine when one or both of the ribbons is or are broken or exhausted. Fig. 9 is a side elevation of the last-mentioned locking apparatus. Fig. 9$^a$ is a plan of a portion of the alarm-actuating mechanism shown in Fig. 9. Fig. 10 is a front elevation, partly in section, showing the alarm or signaling apparatus for indicating when the ribbons are broken or exhausted. Fig. 11 is a side elevation of the last-mentioned apparatus. Fig. 12 is an elevation, partly in section, of our brake apparatus for checking the momentum of certain parts of the apparatus. Fig. 13 is a perspective view of a double tablet.

Referring to the before-mentioned machine, with its notation adapted for English money, we mount or fix plates, cards, or tablets $a$ $a'$ $a^2$ $a^3$, Figs. 1$^b$, 2$^a$, and 4, on the ends of the arms of oscillating or vibrating levers $b$ $b'$. These plates have marked upon them the figures necessary to form the money sequence it is desired to show. When the machine is required to present one side to the operator and the other side to the customer, we in the shilling and pence tablets $a'$ $a^2$ mark the figures on both sides of the tablets, and in the pounds and fraction of a penny tablets $a$ and $a^3$ we arrange two tablets for each figure or figures on the vertical arm $b$ of each tablet-lever $b$ $b'$—namely, one to show at one side of the machine and the other to show at the other side. Screens $y$, Figs. 2$^a$ and 4, may be suspended from the top of the casing and are so placed in proximity to the indicator-opening as to hide from view the shilling and pence series of tablets $a'$ and $a^2$, when those tablets are out of use or not indicating. For the pounds and fractions of a penny tablets $a$ and $a^3$ the above-described screens are not required, as those tablets retreat behind the case of the machine.

The tablet, with its appurtenances, is shown in Fig. 1$^b$ as arranged for exposure on one side only—namely, the key-board side—of the machine. When it is desired to expose the amount on both sides of the machine—namely, on one side for the customer and on the other side for the operator's observance, the sequence of figures in the latter case appearing reversed—then we place the screens $y$ and $y$ on both sides of the series of shilling and pence tablets, so as to hide them from view (when not in use) both from the front and the back of the machine. We also in this latter case make the pound and fraction of a penny tablets in a double manner, as shown in Fig. 13, connecting the two sides, as shown, and we modify or remove a portion of the guide-slips $y'$, Fig. 2$^a$, so that they do not obstruct the movements of the double tablets when thus constructed. We also prolong the tablets at the back part $y^2$, as shown in Fig. 13, so that they never quite leave each other, and so form guides to one another. The horizontal arms $b'$ of the tablet-levers $b$ $b'$ are in connection with the tail ends $c$ of the pivoted key-levers $c'$, the whole of the levers being kept in position by guide-pins $c^2$ on opposite sides of the lever-arms $b'$, as shown in Figs. 3 and 3$^a$.

Each tablet-lever is provided in its vertical arm $b$ with a pin $c^3$ or other suitable contrivance, which engages with one of a series of pawls $d$, arranged in the form of a comb. (Figs. 1, 1$^a$, and 3$^a$.) The pawls $d$ are pivoted between the vertical arms $b$ of the vibrating tablet-levers, and are for the purpose of holding the tablet-levers in position during the time the tablets are exhibited. This is performed by permitting the pawls $d$ to engage with the aforesaid pins $c^3$ on the upward stroke of the tablet-levers, so that the latter are held in position for exhibiting the tablets. On the depression of the key-levers $c'$, the pawls $d$, which are preferably integral or rigid together, are lifted out of gear and the tablet-levers are thus released and allowed to fall or to be pulled back by the action of springs $b^2$, to their normal position. It will thus be seen that on the next account being recorded the depression of any one key or series of keys $c^4$ causes, by means of suitable mechanism hereinafter described, all the pawls $d$ to be raised or lifted out of gear, and all the tablet-levers to be released and to be returned to their normal position.

The manner in which the pawls $d$ are actuated is as follows, reference being had to Figs. 1 to 3 of the drawings: On a spindle $e$ running the whole length of the machine levers $e'$ are fixed, having at their extremities a movable bar $e^2$ (or bars,) which bar (or bars) rest upon the tail ends $c$ of all the key-levers $c'$. Upon the spindle $e$ is a tappet-lever $e^3$, which engages with a spring-catch $e^4$, mounted on a vertical rod $e^5$. The upward motion of this rod by means of levers $e^6$, resting on said rod and mounted on a shaft to which the pawls $d$ are attached, raises the pawls $d$, sufficiently to allow the tablet-levers to return to their normal position. The before-mentioned catch $e^4$ is so pivoted and held in position by a spring $e^7$, that it allows the tappet-lever $e^3$ to pass it on the return stroke of the tappet-lever. The return of the vertical rod $e^5$ to its normal position is assured by the action of the spring $e^8$.

As each transaction is indicated or shown it is by suitable gearing at the same time recorded by means of hands or pointers $f$ upon one or more dials $f'$, according to the number of denominations. On the face of each dial a suitable stop $f^2$ is formed for the purpose of facilitating the hands or pointers $f$ being set or adjusted to zero. This stop is so fashioned as to allow the hands to travel over it when moving in the direction for registering, but catches or stops the hand when turned back to zero. Also, as each denomination has its respective dial, that which is indicated upon the dial of any one denomination is the total of the inincated sums belonging to that particular denomination. The hands or pointers $f$ of the dials $f'$ are actuated by means of an ordinary arrangement of pawls $g$ and ratchet-wheels $g'$, Figs. 1, 1$^b$, and 2$^a$, working a train of wheel work or gearing $g^2$, Fig. 1$^b$, suitably ratioed to the denomination of the respective dials, in connection with levers $h$, having horizontal bars $h'$ on their ends, as shown in Figs. 1 to 3. The ratchet-wheels $g'$ are provided with stationary or retaining pawls $g^4$. The bars $h'$ have upon their upper edges graduated steps or depressions or pins or adjustable screws $h^2$, Fig. 1, for the purpose of regulating the amount of stroke to be given to the before-mentioned ratchet-wheels, and thence through the wheelwork to the pointers or hands of the dials. Thus the proportionate amount of motion is given to the hands of the dials, in accordance with the sums to be registered. These bars are preferably placed underneath the front portion of the levers $c'$, which carry the keys or buttons $c^4$, and as these levers in their downward stroke come in contact with the before-mentioned graduated bars $h'$ or with the pins or screws $h^2$ of the same they drive the bars downward the desired amount. The extreme limit of motion of the levers $c'$ is regulated in its upward stroke by the bar $c^5$ and by the bar $c^6$, Fig. 2, in its downward stroke. Also, the upward movement of the graduated bars $h'$ is regulated by the stop-piece $h^4$, as shown in Figs. 2 and 3$^a$. These graduated bars are carried upon one end of a pivoted lever or levers $h$, the other end $h^3$ of the lever or levers being connected in each case (namely, of the four denominations) by means of a connecting-rod $i$ (or with a lever $i'$ and connecting-rod $i$, as the case may be) to the pawl-lever $g^3$, which actuates the wheel-work $g^2$, for working the hands or pointers $f$ of the dials $f'$. A bell or gong $j$, Figs. 1, 2, and 3, or other suitable form of alarm, is caused to be sounded upon the depression of any one or more keys.

We sometimes release the tablet-levers $l$ by an independent key or pull knob $k$, (placed in connection with the before-mentioned series of pawls $d$,) as shown in Fig. 6. In this latter arrangement (which will be hereinafter more fully described when treating of the printing system of recording) the pawls $d$ are not arranged to move together, as in the first-mentioned arrangement, but are each separate from one another, so that each one is actuated independently by its own tablet-lever only. In this arrangement of pawls the keys need not be simultaneously depressed, but may be depressed one after the other. The actuation of the releasing key or knob alone releases all the pawls $d$ and through them all the tablet-levers $b$ at one time, and thereby allows the tablets, as in the former case, to assume their normal position before another transaction is recorded. During the latter part of the movement of the release key or pull a bell, gong, or alarm $j'$ is sounded, which gives notice that the amount of the last transaction then being cleared from the indicating opening or openings by this release-key has been registered and that the machine is in a condition to indicate and register a new transaction. When this release-key is used and sounds a bell, then the tablet-keys of the denominations need not sound a bell on being depressed. In this latter case where we use a releasing-key we sometimes, in lieu of recording by dials and pointers, record by a printing arrangement, which registers by printing the various transactions on a continuous ribbon through the intervention of another ribbon of carbonized paper or other suitably-prepared material placed between it and type-disks. The carbonized ribbon after leaving the type-disk $l$ and passing between the feed-rollers $n$, Fig. 5, is received and wound upon a reel $x$, this reel being rotated by a suitable spring $x'$ and fitted with suitable multiplying-gear $x^2$ to give the required number of revolutions to the reel.

The printing arrangement consists of disks in number corresponding with the number of the money denominations (in the present example four) for which the machine is arranged. On the periphery of these disks are placed type figures or numbers agreeing with the figures or numbers on the tablets; also, in addition to such figures each disk is arranged with a blank space or zero-mark upon it. These type-disks are actuated and set in any required position in the following manner, reference being had to Figs. 5 and 6.

That we may be more clearly understood, we will describe the action of one type-disk alone, as the other disks are actuated in a similar manner. Instead of attaching the connecting-rod $i$ (which is actuated by the graduated bar $h'$) to the pawl-lever $g^3$, as hereinbefore mentioned, (when recording by dials,) we attach one end of the connecting-rod $i$ to a toothed segment $l'$, the teeth of which gear into a pinion-wheel $l^2$, fixed to or formed in one with a disk $l^3$, and loose on the spindle $l^4$ of the type-disk $l$. This disk carries a pawl $l^5$, which engages with a one-toothed ratchet-wheel $l^6$, the latter being fixed on the spindle $l^4$, upon which the type-disk $l$ is mounted. Connected or fixed to this one-toothed ratchet-wheel $l^6$ is another ratchet-wheel $l^7$, suitably divided according to the denominations of the type-disk with which it is connected. This latter ratchet-wheel $l^7$, with its pawl $l^8$ for the purpose of retaining the type-disk $l$, is in its proper position against the action of a spring $l^9$, Fig. 6ª, which returns the type-disk to its normal or zero position. The last-mentioned pawl $l^8$ is disengaged from its ratchet-wheel $l^7$ by the action of the release-key $k$, and the type-disk $l$ is returned to its blank or zero position. This is performed in the following manner: The shaft $t$, carrying the pawl $l^8$, has a lever $t'$ fixed upon it. On the end of this lever is jointed a rod $t^2$, guided at the other end by the fixed bearing $t^3$. The rod $t^2$ has a pulley $t^4$ on the lower end of it, which is kept in contact with the sliding bar $m'$ by the downward action of the spring $t^5$ on the rod $t^2$. When the sliding bar $m'$ is being moved forward by the action of drawing out the release-key $k$ the raised portion $t^6$ on the sliding bar $m'$ raises the pulley and the rod $t^2$, and so communicates the motion to the pawl $l^8$, raising it out of its ratchet-wheel and allowing the type-disk to return to zero. The movement of the platen $m$ necessary to give the impression for printing is obtained by the movement of the releasing-key or pull $k$. This key or pull $k$ is connected to a sliding bar $m'$, which has upon it a suitably-shaped raised portion $m^2$, which comes in contact with a roller $m^3$, attached to the platen-plunger $m^4$, thereby raising the same and the platen $m$ during a certain part of its stroke. The above-mentioned roller $m^3$ of the platen-plunger is pivoted and arranged in such a manner—namely, by being carried by links $m^{14}$, one of which has a projection $m^{15}$, which engages with a lever-catch $m^5$, pivoted to the before-mentioned sliding bar $m'$, that it can tilt the roller $m^3$ out of the way of its raised portion $m^2$ and thereby prevent the raising of the platen $m$ on the return stroke of the bar $m'$. There is also a pressure-roller $m^{16}$ beneath the sliding bar to relieve the strain on the bar when printing. The sliding bar $m'$ is arranged to impart in a similar manner by other raised portions on the same (through the intervention of a pawl $m^8$, acting on a ratchet-wheel $m^{13}$, Fig. 5, attached to one of a pair of feed-rollers $n$ and through which the ribbon $p^5$ passes) the necessary amount of movement to the ribbons, as well as ringing a bell or alarm $j'$, the latter being actuated by the pin $j^3$ on the sliding bar $m'$, striking the tail end $j^4$ of the lever $j^5$, as shown in Fig. 6, and releasing the tablets, as before mentioned. We will now proceed more fully to describe these movements. A cam $m^6$ gives motion to the lever $m^7$ and pawl $m^8$ by means of the connecting-rod $m^9$. This connecting-rod $m^9$ is jointed to the lever $m^7$ and is guided in the fixed bearing $m^{10}$. The lower end of the rod has a roller $m^{11}$, on which it runs on the cam above mentioned and is kept down on the same by the spring $m^{12}$. The ratchet-wheel $m^{13}$ is actuated by the pawl $m^8$, and is fixed to the spindle of one of the feed-rollers $n$ and gives the proper motion to the same. The ratchet-wheel $m^{13}$ is provided with a retaining-pawl $m^{17}$. The other feed-roller is actuated by means of this motion of the first-mentioned roller by the toothed wheels $n'$. The releasing of the tablets by the sliding bar is performed as follows: As illustrated in Figs. 5, 6, and 7, the cam $o$ on the sliding bar $m'$ acts upon the end $o'$ of the lever $o^2$ and this motion is conveyed by the short end $o^3$ of the lever to the rod or bar $o^4$, which is in contact with the tail end $d'$ of all the pawls $d$. As before mentioned, these pawls are in this case all separate and independent of each other and loose upon the spindles $d^2$ and $d^3$. The levers $o^2$ and $o^3$ are fixed to the spindle $d^2$. The rods or bars $o^4$ are so connected as to act in unison by means of the levers $d^4$ and $d^5$.

The machine is sometimes provided with a suitable locking arrangement for the purpose of fixing the working parts, (so as to prevent the machine being unauthoritatively worked,) as shown in Fig. 9. This we carry out by shooting the bolt $u$ of an ordinary lock $u'$ into a quadrant $u^2$, fixed on the end of the shaft or spindle $e$. We also, in cases where we register by printing, arrange so that when either of the lengths of ribbon has run out or become broken the machine becomes locked, so that it cannot be further worked, and this mechanism may also be made to sound a bell or alarm and actuate a warning-indicator. The alarm-bell $z^2$, (see Fig. 9,) giving notice when the paper is run out, is actuated by the projection $z'$ on the nut $z$, coming in contact with the tail end $z^2$ of the bell-hammer lever $z^3$. This causes the bell to be struck by the hammer $z^4$ when the nut is moving in one direction—namely, when moving in the direction for locking. The hammer is returned to its normal position by the spring $z^5$. To escape actuating the bell when the nut is being returned for resetting the bell, the tail end $z^2$ of the lever is provided with a rule joint and spring to the same. This locking apparatus consists of a frictional attachment to the two reels on which the ribbons are wound, whereby on either of them being run out of ribbon or on breaking of either of the ribbons a spring is released and thereby allowed to act so as to shoot a bolt into some part of the mechanism of the machine that has motion, thus locking the machine and preventing its being further used while in that state.

We arrange the mechanism of the above locking apparatus in the following manner, reference being had to Figs. 8 and 9. We attach a grooved pulley $p$ to each of the supply-ribbon reels $p'$, so that the two rotate together—namely, each reel and its accompanying grooved pulley. A band or cord $p^2$ is passed partly round the two grooved pulleys $p$, having its ends $p^3$ fixed or attached by the intervention of a spring $p^{17}$ to some part of the framing of the machine, while that portion of the cord lying between the grooved pulleys $p$ $p$ is kept taut by a third or intermediate pulley $p^4$, which presses down the cord, so giving between it and those portions of the grooved pulleys with which it is in contact a certain amount of friction, but not more friction than the strength of either of the ribbons $p^5$ will bear in their action of rotating the pulleys, when being unwound from the same, by the motion of the feed-rollers $n$ of the printing mechanism before described. The intermediate pulley $p^4$ is on one end of a bell-crank lever $p^6$, the other end of which lever forms a pawl $p^7$, which is, by means of the pull or drag on the ribbons $p^5$, kept in gear with a ratchet-wheel $p^9$. This ratchet-wheel is fixed on a spindle $p^{10}$, to which is also attached one end of a spring $p^{11}$, the other end of the spring being fastened to the frame $p^{16}$ of the machine. When the pawl $p^7$ is out of gear with the ratchet-wheel $p^9$, which takes place when either of the ribbons is run out or accidentally broken (for then the spring $p^8$, connected to the bell-crank lever $p^6$, can pull the pawl $p^7$ out of gear,) then the spring $p^{11}$, attached to the spindle, rotates the same, and in so doing, by means of a screw $p^{12}$ on the other end of the spindle $p^{10}$, propels (through the interposition of a bell-crank lever $p^{13}$) a bolt $p^{14}$ (provided with a telescopic spring-end $p^{15}$) forward into some suitable moving portion of the mechanism, preferably when at its position of rest, or it is made to lock the same by actuating a movable or pivoted bar. In the present case it is shown arranged to shoot into a slot $w$ in the sliding bar $w'$ on that bar arriving at the end of its stroke. This bar receives motion from a lever $w^2$, fixed upon the before-mentioned spindle $e$.

The construction of the above-mentioned telescopic end $p^{15}$ is as follows, reference being had to Fig. 9. The internal spring $p^{17}$ is more powerful in its action than the external spring $p^{18}$. The former acts between the telescopic end $p^{15}$ and the bolt $p^{14}$, and the external spring $p^{18}$ between a fixed bearing $p^{19}$ and the collar $p^{20}$ on the telescopic end $p^{15}$. When the internal spring $p^{17}$ is under compression by the descent of the bolt $p^{14}$ it has sufficient power to drive down the telescopic end $p^{15}$ in opposition to the force exerted by the external spring $p^{18}$ until it shoots the same into the notch $w$ or shoots it onto the top of the bar $w'$, where it remains until by the motion of the bar the notch $w$ in the bar comes into position to receive the telescopic end.

In lieu of the before-mentioned locking-gear we also sometimes arrange an arm or tablet to each length of ribbon to be conspicuously displayed to give notice when either of the ribbons has nearly run out or broken. This arrangement is shown in Fig. 10, and is as follows: We fit upon one end of a rod $r$ an indicator $r'$, and on the other end of the same rod or on a lever $r^4$ in contact with the rod a projection or arm $r^2$ sometimes fitted with a roller, which rests against some portion of the ribbon $p^5$ in tension—namely, some part of the ribbon between the reels $p'$ and the feed-rollers $n$. The rod $r$ is also fitted with a spiral or other form of spring $r^3$, which tends to project the indicator $r'$, but is prevented from so doing by reason of the projection or arm $r^2$ on the rod $r$, or on the lever $r^4$,) being caught or held back by the ribbon. When the ribbon is exhausted from the reels or is broken, the projection or arm $r^2$ being then freed, the rod shoots forward and the warning-indicator $r'$ is thrust forward and displayed. In lieu of this signal arrangement a bell or gong $s$ may be sounded or a combination of both, as shown in Figs. 10 and 11, may be used. Suitable brake or retaining apparatus is applied where necessary to the spindles and wheels to check recoil. This we preferably construct as follows, referring to Fig. 12: On the part to be checked—say, for example, a type-wheel $l$—we insert in the side of the same a pin $v$, which on the wheel approaching its position of rest comes in contact with one arm $v'$ of a bell-crank lever $v^2$, which is pivoted to a carriage $v^3$, attached to some part of the framing of the machine. This arm $v'$ has more or less spring in it, and the pin $v$ pressing against the same propels the brake-surface of the other arm $v^4$ of the bell-crank lever $v^2$ firmly against a portion of the surface of the type-wheel.

The operating-keys may be arranged in any convenient manner and varied to suit the purpose to which the apparatus is to be applied; but in its application to English money we prefer to arrange the keys for the left hand in such a manner that the "pounds" keys are placed centrally, so as to be within reach of the fingers of the left hand, and the keys for the fractions of a penny are similarly placed for the right hand, as shown in Fig. 3.

In applications of even date herewith, Serial Nos. 326,815 and 326,816, we have shown, described, and claimed in the first-named case the combination, in a cash-register, of indicating, registering, and printing devices and their operating mechanisms, and in the second above-named case the combination, in a cash-register, of a series of concentrically-mounted drums or cylinders adapted to indicate any desired amount, means for operating said cylinders to expose the amount registered, a printing mechanism for recording the said amounts, and a case or cover adapted to conceal either the figure openings or the operating-levers; and we would have it understood that we do not claim such in this application.

What we herein claim as our invention is—

1. In a cash-register, the combination of a series of oscillating tablets having prolonged portions, whereby each is adapted to serve as a guide to another, a series of two-armed levers connected with said tablets, a series of key-levers, and a series of pawls each adapted to hold a tablet in its exposed position and to release it when a key is actuated, substantially as described.

2. In a cash-register, the combination of a series of oscillating tablets, a series of two-armed levers $b\,b'$, connected with said tablets, the vertical arms $b$ of said levers being provided with pins $c^3$, the key-levers $c'$, the pawls $d$, adapted to engage the pins on the lever-arms $b$, and mechanism connected with and operated by the key-levers, substantially as described, to tilt said pawls and release the tablets, substantially as specified.

3. In a cash-register, the combination, with the series of tablets, the key-levers, the series of type-wheels operated by the key-levers, and the mechanism for printing from said type-wheels, of the independent pawls $d$, adapted to engage the tablet-levers, and the bar $o^4$, adapted to be operated by the printing mechanism to tip the bars $d$ and release the tablet-levers, substantially as described.

FREDERICK ALFRED MESSER.
WALTER FULLER THORPE.

Witnesses:
GEORGE C. DOWNING,
    8 *Quality Court, London, W. C.*
T. F. BARNES,
    17 *Gracechurch Street, London.*